US 8,381,711 B2

(12) United States Patent
Loveless

(10) Patent No.: US 8,381,711 B2
(45) Date of Patent: Feb. 26, 2013

(54) UNIVERSAL DUST COLLECTION SHROUD FOR HIGH SPEED GAS POWERED SAWS

(75) Inventor: Spencer Loveless, Price, UT (US)

(73) Assignee: Dustless Depot, LLC, Price, UT (US)

( * ) Notice: Subject to any disclaimer, the term of this patent is extended or adjusted under 35 U.S.C. 154(b) by 351 days.

(21) Appl. No.: 12/816,976

(22) Filed: Jun. 16, 2010

(65) Prior Publication Data
US 2010/0313867 A1 Dec. 16, 2010

Related U.S. Application Data

(60) Provisional application No. 61/187,404, filed on Jun. 16, 2009.

(51) Int. Cl.
B28D 1/04 (2006.01)
(52) U.S. Cl. ............... 125/13.01; 125/2; 125/3
(58) Field of Classification Search ........... 125/2, 3, 125/13.01
See application file for complete search history.

(56) References Cited

U.S. PATENT DOCUMENTS

| 907,734 A | 12/1908 | Butterfield |
| 1,123,562 A | 1/1915 | Lund |
| RE15,262 E | 1/1922 | Gurgel |
| 1,643,882 A | 9/1927 | Faiver |
| 2,032,382 A | 3/1936 | Torrison |
| 2,041,689 A | 5/1936 | Baumeister |
| 2,279,186 A | 4/1942 | Terry et al. |
| 2,291,269 A | 7/1942 | Wiggleworth |
| 2,503,854 A | 4/1950 | Trainor |
| 2,520,725 A | 8/1950 | Judd |
| 2,803,098 A | 8/1957 | Robert et al. |
| 2,819,570 A | 1/1958 | Tocci-Guilbert et al. |
| 2,819,571 A * | 1/1958 | Morgan .................. 451/456 |
| 2,994,995 A | 8/1961 | Griffith |
| 3,166,877 A | 1/1965 | Reames |
| 3,256,648 A | 6/1966 | Subonovich |
| 3,468,076 A | 9/1969 | Jones |
| 3,667,170 A | 6/1972 | MacKay |
| 3,673,744 A | 7/1972 | Oimoen |
| 3,835,543 A | 9/1974 | Polydoris et al. |
| 3,848,686 A | 11/1974 | Jysky et al. |
| 3,862,521 A | 1/1975 | Isaksson |
| 3,882,598 A | 5/1975 | Earle et al. |
| 3,882,644 A | 5/1975 | Cusumano |
| 3,945,281 A | 3/1976 | Kreitz |
| 4,063,478 A | 12/1977 | Stuy |
| 4,090,297 A | 5/1978 | Wanner et al. |
| 4,135,334 A | 1/1979 | Rudiger |
| 4,201,256 A | 5/1980 | Truhan |
| 4,253,362 A | 3/1981 | Olson |
| 4,381,628 A | 5/1983 | Dicke |
| 4,400,995 A | 8/1983 | Palm |
| 4,574,532 A | 3/1986 | Haberle et al. |
| 4,576,072 A | 3/1986 | Terpstra et al. |

(Continued)

FOREIGN PATENT DOCUMENTS

| EP | 556713 | 8/1993 |
| EP | 0579964 | 1/1994 |

(Continued)

Primary Examiner — Lee D Wilson
Assistant Examiner — Shantese McDonald
(74) Attorney, Agent, or Firm — Pate Peterson, PLLC; Brett Peterson

(57) ABSTRACT

A universal dust shroud is mountable to many high speed gas powered concrete cutting saws while remaining strong and stable. The dust shroud is adjustable to properly fit the saw and effectively collect dust and debris.

22 Claims, 4 Drawing Sheets

U.S. PATENT DOCUMENTS

| | | | |
|---|---|---|---|
| 4,622,782 A | 11/1986 | Roestenberg |
| 4,697,389 A | 10/1987 | Romine |
| 4,761,877 A | 8/1988 | Rupp |
| 4,782,632 A | 11/1988 | Matechuk |
| 4,868,949 A | 9/1989 | Loveless et al. |
| 4,921,375 A | 5/1990 | Famulari |
| 4,932,163 A | 6/1990 | Chilton et al. |
| 4,932,164 A | 6/1990 | Sullivan et al. |
| 5,033,552 A | 7/1991 | Hu |
| 5,074,044 A | 12/1991 | Duncan et al. |
| 5,084,972 A | 2/1992 | Waugh |
| 5,105,585 A | 4/1992 | Hampl et al. |
| 5,125,190 A | 6/1992 | Buser et al. |
| 5,131,192 A | 7/1992 | Cheng |
| 5,163,252 A | 11/1992 | Garner et al. |
| 5,167,215 A | 12/1992 | Harding, Jr. |
| 5,176,408 A | 1/1993 | Pedersen |
| 5,201,785 A | 4/1993 | Nagano |
| 5,237,781 A | 8/1993 | Demetrius |
| 5,327,649 A | 7/1994 | Skinner |
| 5,339,571 A | 8/1994 | Timmons et al. |
| 5,411,433 A | 5/1995 | Keller |
| 5,435,066 A | 7/1995 | Bare et al. |
| 5,440,809 A * | 8/1995 | Padilla ............. 30/124 |
| 5,445,056 A | 8/1995 | Folci |
| 5,545,082 A | 8/1996 | Courson et al. |
| 5,558,571 A | 9/1996 | Toyoshima et al. |
| 5,564,408 A | 10/1996 | Bassols |
| 5,566,457 A | 10/1996 | Batschari et al. |
| 5,575,035 A | 11/1996 | Reis et al. |
| 5,582,225 A | 12/1996 | Schank |
| 5,588,213 A | 12/1996 | Swanberg |
| 5,609,516 A | 3/1997 | Courson et al. |
| 5,653,561 A | 8/1997 | May |
| 5,675,895 A | 10/1997 | Mori et al. |
| 5,688,082 A | 11/1997 | Richardson |
| 5,704,956 A | 1/1998 | Loveless et al. |
| 5,713,785 A | 2/1998 | Nishio |
| D392,531 S | 3/1998 | Richardson |
| 5,774,992 A | 7/1998 | Lindenmuth |
| 5,791,979 A | 8/1998 | Duncan et al. |
| 5,816,733 A | 10/1998 | Ishikawa et al. |
| 5,931,072 A | 8/1999 | Shibata |
| 5,954,863 A | 9/1999 | Loveless et al. |
| 6,027,399 A | 2/2000 | Stewart |
| 6,053,674 A | 4/2000 | Thompson |
| 6,108,912 A | 8/2000 | Radigan |
| 6,138,317 A | 10/2000 | Holmes et al. |
| 6,167,626 B1 | 1/2001 | Doumani et al. |
| 6,219,922 B1 | 4/2001 | Campbell et al. |
| 6,273,081 B1 | 8/2001 | Gorgol et al. |
| 6,318,352 B1 | 11/2001 | Gnazzo et al. |
| 6,347,985 B1 | 2/2002 | Loveless |
| 6,470,778 B1 | 10/2002 | Kaye, Jr. et al. |
| 6,471,574 B1 | 10/2002 | Rupprecht et al. |
| 6,557,261 B1 | 5/2003 | Buser et al. |
| 6,648,742 B1 | 11/2003 | Segiel, Jr. |
| 6,679,145 B1 | 1/2004 | Lee |
| 6,699,114 B1 | 3/2004 | Booeshaghi et al. |
| 6,726,554 B1 | 4/2004 | Chen et al. |
| 6,748,660 B2 * | 6/2004 | Buser et al. ............. 125/12 |
| 6,796,208 B1 | 9/2004 | Jorgensen |
| 6,811,476 B2 | 11/2004 | Ohlendorf |
| 6,823,907 B2 | 11/2004 | Cheng |
| 6,860,799 B2 | 3/2005 | Loveless |
| 6,878,050 B2 | 4/2005 | Wendt et al. |
| 6,902,594 B2 | 6/2005 | Cho |
| 6,935,939 B1 | 8/2005 | Buser et al. |
| 6,948,412 B2 | 9/2005 | Brazell et al. |
| 6,960,124 B2 | 11/2005 | Lee |
| 7,013,884 B2 | 3/2006 | Guth |
| 7,044,039 B2 | 5/2006 | Powell |
| 7,047,647 B1 | 5/2006 | Muller et al. |
| 7,047,650 B2 | 5/2006 | Chen |
| 7,171,880 B2 | 2/2007 | Powell |
| 7,195,429 B2 | 3/2007 | Dods et al. |
| 7,197,826 B2 | 4/2007 | Baxivanelis et al. |
| 7,198,559 B2 | 4/2007 | Walstrum et al. |
| 7,223,161 B2 | 5/2007 | Kodani et al. |
| 7,300,337 B1 * | 11/2007 | Sun et al. ............. 451/295 |
| 7,578,063 B2 | 8/2009 | Martin |
| 7,625,265 B2 | 12/2009 | Woods et al. |
| 7,635,293 B2 | 12/2009 | Sun et al. |
| 7,661,195 B1 | 2/2010 | Wood et al. |
| 7,740,086 B2 | 6/2010 | Bleicher et al. |
| 7,887,624 B2 | 2/2011 | Ekstrom et al. |
| 7,892,075 B2 | 2/2011 | Esenwein |
| 7,985,042 B1 | 7/2011 | Paxton |
| 2005/0088866 A1 | 4/2005 | Levine |
| 2006/0019585 A1 | 1/2006 | Zayat |
| 2007/0079589 A1 | 4/2007 | Ekstrom et al. |
| 2007/0155296 A1 | 7/2007 | Hofmann et al. |
| 2007/0178815 A1 | 8/2007 | Buser |
| 2007/0193759 A1 | 8/2007 | Sweig et al. |
| 2007/0251104 A1 | 11/2007 | Heinrichs et al. |
| 2008/0060631 A1 | 3/2008 | Dofher |
| 2008/0099053 A1 | 5/2008 | Loveless |
| 2008/0109986 A1 | 5/2008 | Loveless |
| 2008/0200103 A1 | 8/2008 | Esenwein |
| 2008/0271323 A1 | 11/2008 | Perlmutter |
| 2009/0181604 A1 | 7/2009 | Loveless |
| 2009/0181605 A1 | 7/2009 | Loveless |
| 2009/0181606 A1 | 7/2009 | Loveless |
| 2009/0183377 A1 | 7/2009 | Loveless |
| 2009/0183800 A1 | 7/2009 | Loveless |
| 2009/0186559 A1 | 7/2009 | Loveless |
| 2009/0311953 A1 | 12/2009 | Maute et al. |

FOREIGN PATENT DOCUMENTS

| | | |
|---|---|---|
| GB | 2 260 721 | 4/1993 |
| GB | 2 262 159 | 6/1993 |
| JP | 10-000559 | 1/1998 |
| JP | 10-15717 | 1/1998 |
| JP | 2001-96525 | 4/2001 |
| KR | 10-2002-0056086 | 7/2002 |
| WO | WO 99/44786 | 9/1999 |

* cited by examiner

United States Patent US 8,381,711 B2

UNIVERSAL DUST COLLECTION SHROUD FOR HIGH SPEED GAS POWERED SAWS

PRIORITY

The present application claims the benefit of U.S. Provisional Application Ser. No. 61/187,404, filed Jun. 16, 2009, which is herein incorporated by reference in its entirety.

THE FIELD OF THE INVENTION

The present invention relates to dust collection shrouds. More specifically, the present invention relates to a universal dust collection shroud for high speed gas powered saws.

BACKGROUND

Dust shrouds have become more commonly used for multiple purposes. Many tasks, such as grinding or cutting cement for example, would particularly benefit from the use of a dust shroud because of the mess which is made while working or because of the potentially hazardous nature of the debris which is generated. Saws, for example, are commonly used for cutting cement, stone, tile or other similar tasks. Without a dust shroud, cement debris is scattered over a wide area. It is desirable to contain the dust which is created for several reasons. It is desirable to contain the dust and debris to keep the workplace cleaner and to minimize the time necessary to clean up afterwards. Fine dust is often created while grinding cement, for example, which spreads a large distance and can be quite difficult to clean up afterwards. It is also desirable to contain the dust and debris to keep the same from getting into the tool itself, causing premature failure of the bearings, motor, etc. Additionally, debris such as concrete dust poses a health risk to the machine operator and others who may breathe it. It is thus desirable to collect the dust to minimize any exposure to the dust.

One difficulty in providing dust shrouds is the fact that each particular tool will have different mounting requirements. For high speed gas powered saws, each saw will typically have a motor, a blade guard, and a handle. For each saw, however, the shapes and positions of the motor, blade guard, and handle vary. As such, the dust shroud must accommodate the particular mounting requirements of the desired tool. Another difficulty in providing dust shrouds is in providing a dust shroud which does not overly interfere with the use of the saw itself.

It is thus appreciated that the requirements for a dust shroud vary according to the particular saw with which the dust shroud is being used. Additionally, a particular model of saw will typically change every few years as new models are introduced. Many stores, however, do not wish to stock many different models of dust shrouds. It is similarly not desirable for a manufacturer to make many different models of dust shrouds, as it increases the tooling and production costs. Individual consumers do not wish to special order a dust shroud and wait for weeks for it to arrive. While universal dust shrouds have become available for some machines, universal shrouds are often limited by the fact that they are marginally suited to any particular saw and often lack the stability and effectiveness which is necessary.

There is thus a need for universal dust shrouds which allow a single shroud to be used with many different brands of tools while still performing properly. Such a universal dust shroud should safely and securely mount to a wide variety of saws while effectively collecting dust and debris and without interfering with the use of the saw.

SUMMARY OF THE INVENTION

It is an object of the present invention to provide an improved universal dust shroud for high speed gas powered saws.

According to one aspect of the invention, a dust shroud is provided which is adjustable to fit many different high speed gas powered saws. The position and angle of the dust shroud and the mounting clamps may be adjusted to fit a desired saw.

According to another aspect of the invention, a dust shroud is provided which partially encloses the saw blade guard, inhibiting movement of the dust shroud and securing the dust shroud to the saw.

The dust shroud is advantageous because it is stable and securely mounted to a high speed gas powered saw while still being universal to many high speed gas powered saws. The dust shroud does not sacrifice effectiveness for universal mounting.

These and other aspects of the present invention are realized in a dust shroud as shown and described in the following figures and related description.

BRIEF DESCRIPTION OF THE DRAWINGS

Various embodiments of the present invention are shown and described in reference to the numbered drawings wherein.

Figure 1:
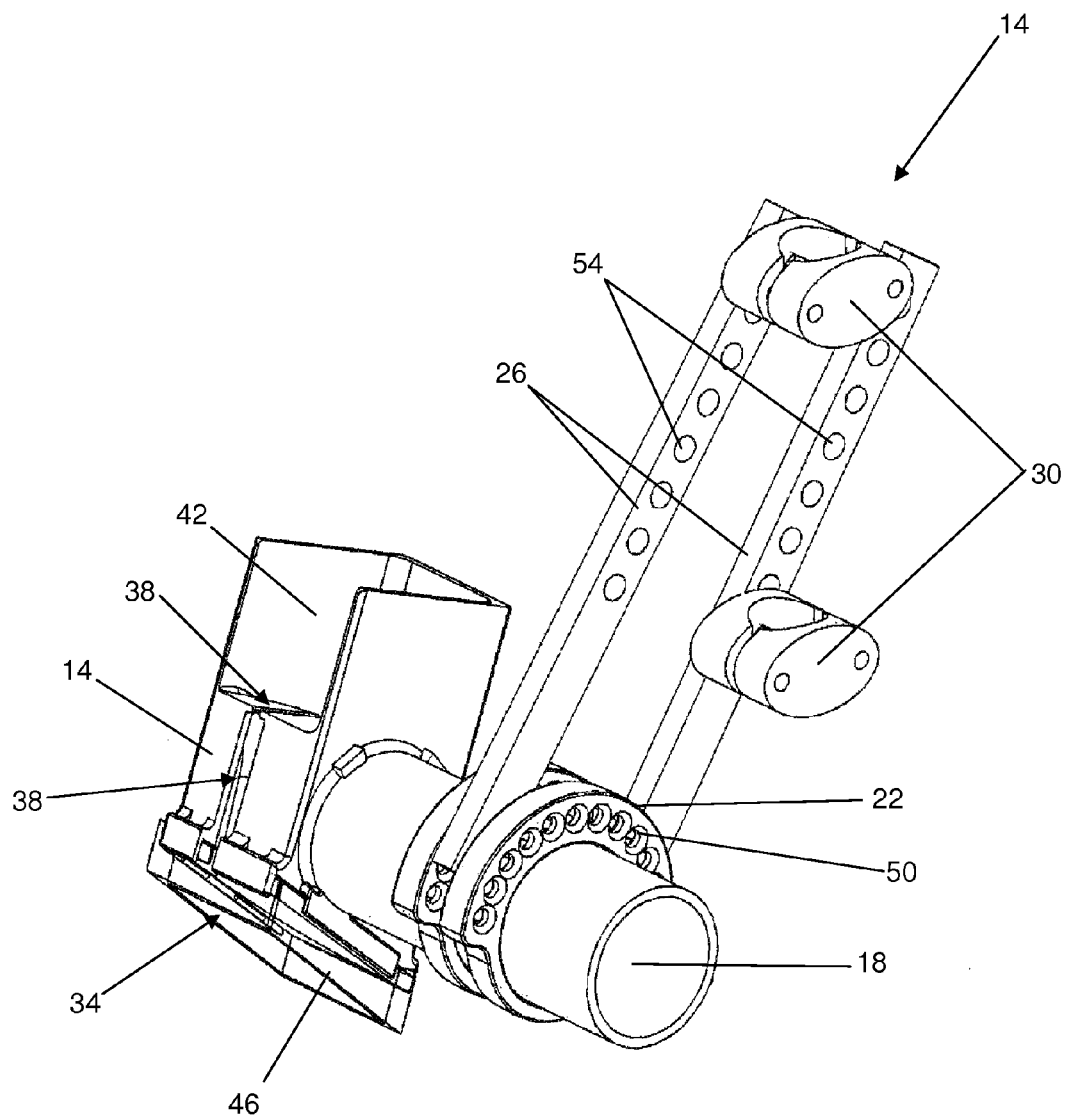
FIG. 1 shows a perspective view of a dust shroud of the present invention.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every figure includes each reference numeral for clarity. Not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 2:
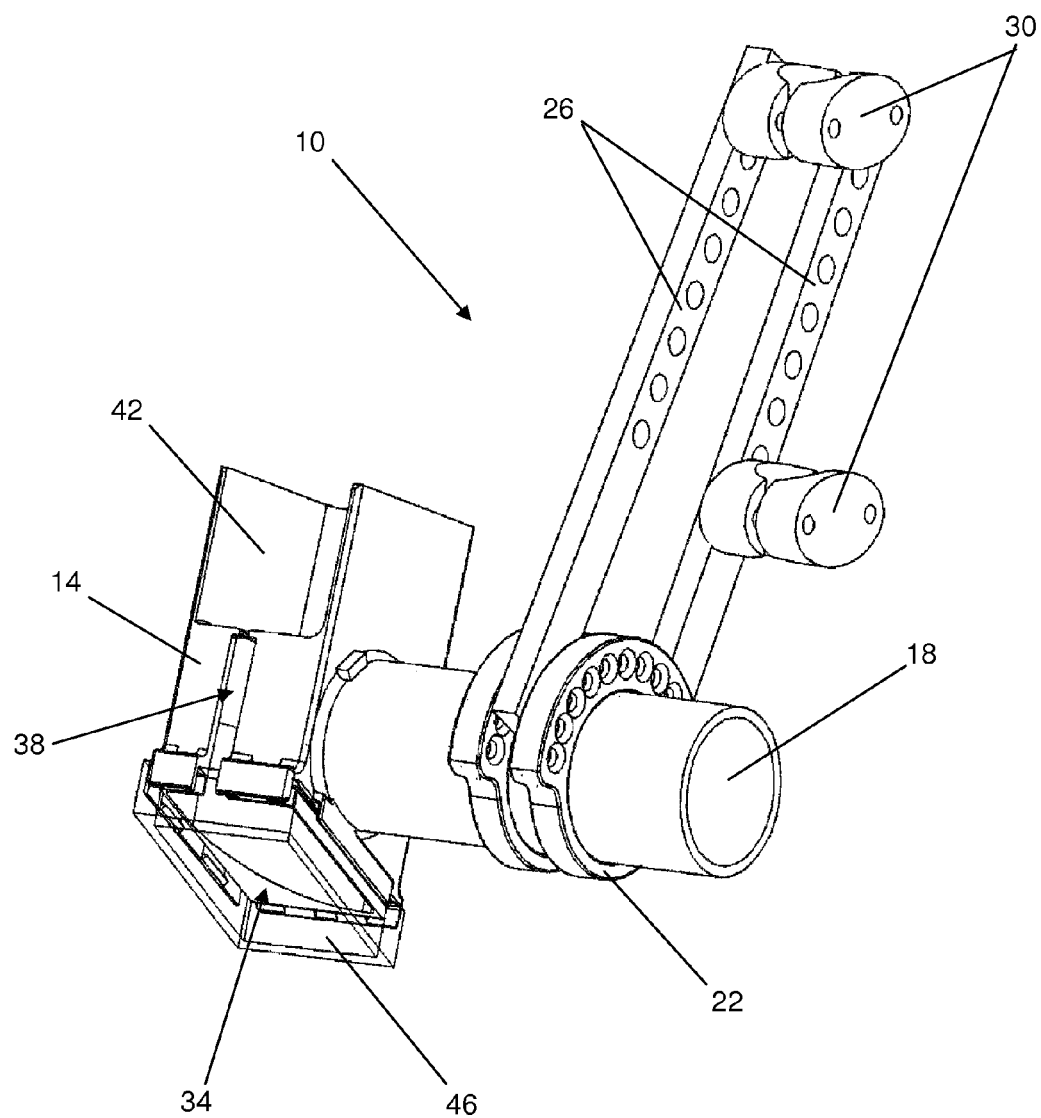
FIG. 2 shows another perspective view of a dust shroud of FIG. 1.
Figure 3:
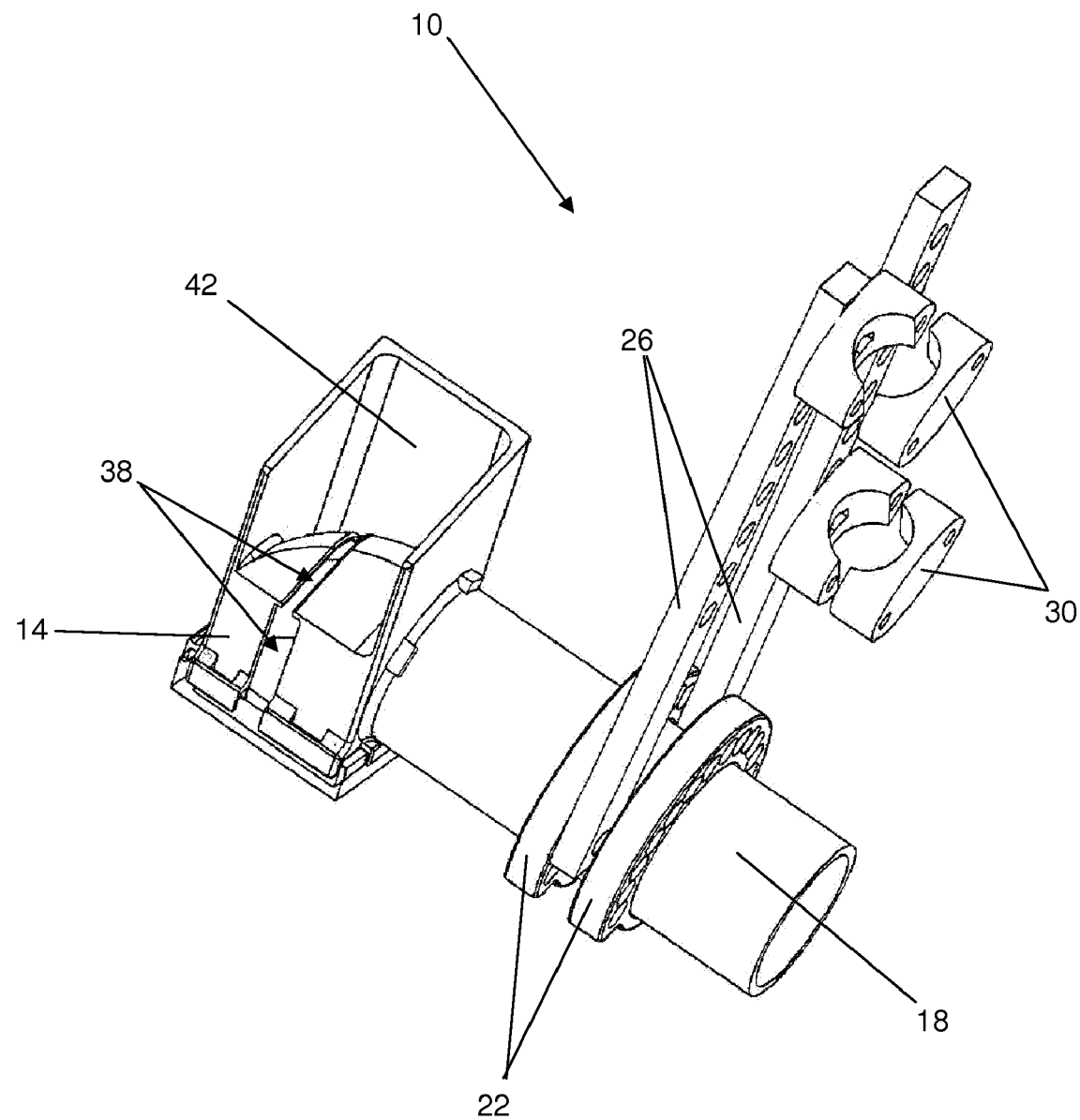
FIG. 3 shows another perspective view of a dust shroud of FIG. 1.

Turning now to FIGS. 1 through 3, perspective views of a dust shroud according to the present invention are shown. The dust shroud 10 includes a shroud body 14, an exhaust port 18, an attachment collar 22, attachment arms 26, and attachment clamps 30. The shroud body 14 is box-like and forms an interior cavity. The shroud body 14 has an open bottom 34, a slot 38 extending upwardly from the open bottom through the front and a portion of the top of the shroud body for receiving a saw blade through the slot, and a collar 42 extending upwardly from the body. The collar 42 extends around a saw blade guard which is part of a saw when the dust shroud 10 is mounted to the saw, thereby stabilizing the shroud. Typically, brushes 46 are placed on the bottom of the shroud body 14. The brushes 46 help to capture dust from cutting a concrete slab.

The exhaust port 18 attaches to a side of the shroud body 14 and extends laterally from the shroud body. The exhaust port 18 is open to the interior of the shroud body. Typically, a vacuum is connected to the exhaust port 18 to collect the dust and debris from the saw. The exhaust port 18 is used to mount the dust shroud 10 to a saw. A mounting collar 22 attaches to the exhaust port 18. The mounting collar 22 may be secured to the exhaust port 18 with set screws or be formed as a split collar which is tightened around the exhaust port. As such, the mounting collar 22 may be mounted at different locations along the exhaust port and may be rotated to a desired angle.

The mounting collar 22 includes holes 50 which are used to attach the mounting arms 26 thereto. The mounting arms 26 may be attached to different holes and at different angles to facilitate attachment of the dust shroud 10 to different models of saws. The mounting arms 26 include mounting holes 54 which are used to attach the mounting collars 30 to the mounting arms 26. The mounting collars 30 are typically split collars that are tightened to clamp to a saw handle. As such, the mounting collars 30 are typically formed to receive a cylindrical body such as a pipe therein.

FIG. 2 better illustrates the opening 34 in the bottom of the shroud body 14. The opening 34 is connected to the slot 38 (which extends upwardly through the front of the shroud body and into the top of the shroud body) in order to receive a saw blade and allow the shroud body 14 to extend around the saw blade sufficiently to effectively capture dust and debris. Dust and debris is carried into the opening 34 by the cutting action of a saw blade. The slot 38 fits more closely to the saw blade and largely prevents debris from exiting the shroud body 14. A vacuum, connected to the vacuum port 18, draws air into the shroud body 14 through the bottom opening 34 and the slot 38 and then out of the shroud body through the vacuum port 18 where it is collected by a vacuum. The air flow collects debris and dust. The brushes 46 are often placed at the bottom of the shroud body 14 and help seal between the shroud body and the surface which is being cut, improving the collection of dust and debris.

FIG. 3 shows the top of the dust shroud 10. It can be seen how the slot 38 extends up through the front of the shroud body and onto the top of the shroud body 14. The slot 38 is wider on the front of the shroud body 14 and narrower on the top of the shroud body as debris is carried into the shroud body at the front and is more likely to be carried out of the shroud. The top of the shroud body 14 may be curved side-to-side as shown in order to smoothly transition airflow from moving upwardly into the shroud body 14 to moving laterally into the exhaust tube 18 to the shroud body, improving the airflow through the shroud. The collar 42 extends upwardly from the shroud body 14, and includes a back wall and side walls and is open on the front.

Figure 4:
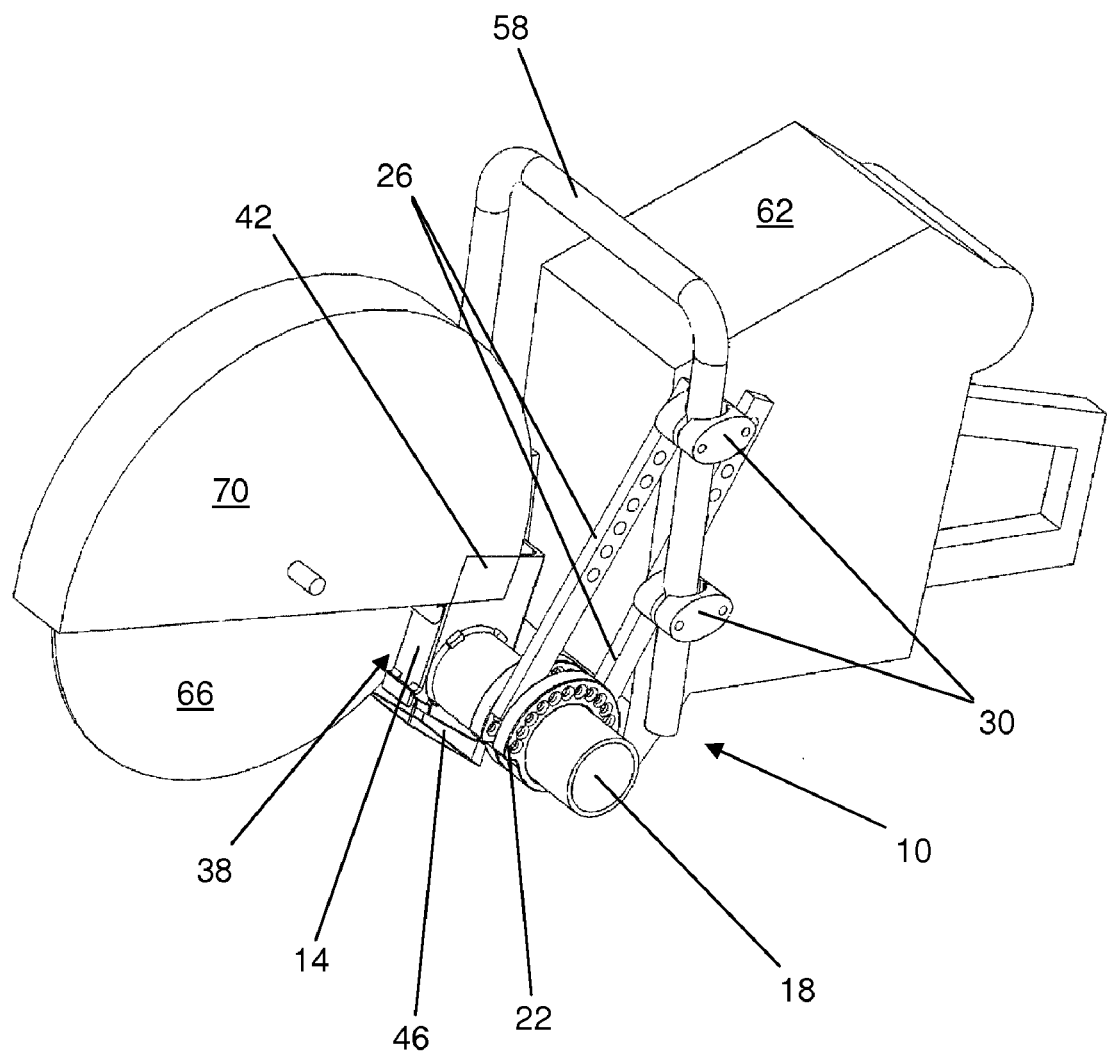
FIG. 4 shows another perspective view of a dust shroud of FIG. 1 mounted to a high speed gas powered saw.

FIG. 4 shows the shroud 10 mounted to a high speed gas powered saw. The saw includes a front handle 58, a motor/body 62, a blade 66 and a blade guard 70. On many such saws, the front handle 58 is formed from round metal tube. The clamps 30 are secured to the handle 58 of the saw. As has been discussed, the dust shroud 10 is adjustable in many directions to properly position the dust shroud on the saw, allowing the dust shroud 10 to fit many different models of saws. The points where the attachment arms 26 are connected to the attachment collar 22 and the points where the clamps 30 are attached to the attachment arms 26 may be adjusted as well as the angular relationship between the collar, arms, and clamps so as to adjust the front/back and up/down position of the shroud body 14 by placing the attachment collar 22 in the proper position relative to the blade 66 and blade guard 70. The exhaust port 18 may be rotated and moved laterally within the attachment collar 22 so as to place the shroud body 14 over the rear portion of the blade 66 and adjacent the blade guard 70. This places the collar 42 around a portion of the saw blade guard 70.

The collar 42 helps to secure and stabilize the shroud body 14, maintaining the proper alignment between the shroud body and the blade 66 and blade guard 70. This helps to prevent damage to the dust shroud during use as well as improving the effectiveness of the dust shroud in collecting dust and debris. The brushes 46 extend the shroud body 14, and will often contact a concrete slab or the like which is being cut, further improving the collection of dust and debris. Once the dust shroud 10 is properly installed on the saw, a vacuum is typically connected to the exhaust port 18 for use of the saw.

The dust shroud 10 is advantageous as it provides a universal configuration which may be adapted to most high speed gas powered saws, making the dust shroud more economical to manufacture and distribute. Additionally, the dust shroud is effective and stable.

There is thus disclosed an improved universal dust shroud for high speed gas powered saws. It will be appreciated that numerous changes may be made to the present invention without departing from the scope of the claims.

What is claimed is:

1. A universal dust shroud for a high speed gas powered saw comprising:
   a shroud body having an open bottom and having a slot formed in the front thereof for receiving a saw blade;
   an exhaust port extending laterally from the shroud body;
   a mounting collar attached to the exhaust port, the collar being selectively movable along the exhaust port, selectively rotatable relative to the exhaust port, and selectively attachable to the exhaust so as to prevent movement relative thereto;
   mounting arms attached to the mounting collar and extending therefrom;
   mounting clamps attached to the mounting arms and attachable to a high speed gas powered saw, and
   wherein the mounting clamps are attachable to a handle of a high speed gas powered saw.

2. The dust shroud of claim 1, wherein the shroud body has a collar extending upwardly therefrom, the collar being positionable around a saw blade guard so as to locate the shroud body relative to the blade guard.

3. The dust shroud of claim 1, wherein the mounting clamps are mountable at a varying distance from the mounting collar along the mounting arms.

4. The dust shroud of claim 1, wherein the mounting arms extend generally perpendicularly to the exhaust port.

5. The dust shroud of claim 1, wherein the mounting collar has a plurality of mounting locations thereon, and wherein the mounting arms may be mounted to different of said plurality of locations.

6. The dust shroud of claim 1, wherein the saw has a saw blade oriented vertically and wherein the exhaust port extends laterally generally parallel to the axis of the saw blade.

7. A dust shroud for a saw, the saw comprising:
   a saw blade disposed vertically;
   a blade guard extending around an upper portion of the saw blade;

a saw body disposed behind the saw blade; and
a handle disposed adjacent the back of the saw blade;
the dust shroud comprising:
a shroud body disposed adjacent the rear of the saw blade and extending around a portion of the saw blade;
an exhaust port extending laterally from the shroud body, the exhaust port being in communication with an interior of the shroud body;
mounting arms attached to the exhaust port and attached to the handle; and
a collar extending upwardly from the shroud body, the collar having an open front, the collar extending around a portion of the blade guard.

8. The dust shroud of claim 7, wherein the shroud body comprises an open bottom, and wherein the shroud body comprises a slot formed through the front thereof and through a portion of the top thereof.

9. The dust shroud of claim 8, wherein a portion of the slot located in the front of the shroud body is wider than a portion of the slot located in the top of the shroud body.

10. The dust shroud of claim 7, wherein the top of the shroud is curved so as to direct air flow towards the exhaust port.

11. The dust shroud of claim 7, further comprising a mounting collar disposed around the exhaust port, wherein the mounting collar may be selectively moved along the exhaust port and selectively rotated about the exhaust port, and wherein the mounting collar may be selectively clamped in position on the exhaust port.

12. The dust shroud of claim 11, wherein the mounting arms attach to the mounting collar.

13. The dust shroud of claim 11, wherein the mounting arms may be attached to the mounting collar in a plurality of different positions and wherein the angle of the mounting arms relative to the mounting collar may be adjusted.

14. The dust shroud of claim 7, further comprising mounting clamps, the mounting clamps being selectively attachable to the mounting arms at different positions along the mounting arms and being attached to the handle so as to thereby attach the mounting arms to the handle.

15. A universal dust shroud for a high speed gas powered saw comprising:
a shroud body having an open bottom and having a slot formed in the front thereof for receiving a saw blade;
an exhaust port extending laterally from the shroud body;
a mounting collar attached to the exhaust port, the collar being selectively movable along the exhaust port, selectively rotatable relative to the exhaust port, and selectively attachable to the exhaust so as to prevent movement relative thereto;
mounting arms attached to the mounting collar and extending therefrom;
mounting clamps attached to the mounting arms and attachable to a high speed gas powered saw, and
wherein the shroud body has a collar extending upwardly therefrom, the collar being positionable around a saw blade guard so as to locate the shroud body relative to the blade guard.

16. A universal dust shroud for a high speed gas powered saw comprising:
a shroud body having an open bottom and having a slot formed in the front thereof for receiving a saw blade;
an exhaust port extending laterally from the shroud body;
a mounting collar attached to the exhaust port, the collar being selectively movable along the exhaust port, selectively rotatable relative to the exhaust port, and selectively attachable to the exhaust so as to prevent movement relative thereto;
mounting arms attached to the mounting collar and extending therefrom;
mounting clamps attached to the mounting arms and attachable to a high speed gas powered saw, and
wherein the mounting clamps are mountable at a varying distance from the mounting collar along the mounting arms.

17. A universal dust shroud for a high speed gas powered saw comprising:
a shroud body having an open bottom and having a slot formed in the front thereof for receiving a saw blade;
an exhaust port extending laterally from the shroud body;
a mounting collar attached to the exhaust port, the collar being selectively movable along the exhaust port, selectively rotatable relative to the exhaust port, and selectively attachable to the exhaust so as to prevent movement relative thereto;
mounting arms attached to the mounting collar and extending therefrom;
mounting clamps attached to the mounting arms and attachable to a high speed gas powered saw, and
wherein the mounting collar has a plurality of mounting locations thereon, and wherein the mounting arms may be mounted to different of said plurality of locations.

18. A universal dust shroud for a high speed gas powered saw comprising:
a shroud body having an open bottom and having a slot formed in the front thereof for receiving a saw blade;
an exhaust port extending laterally from the shroud body;
a mounting collar attached to the exhaust port, the collar being selectively movable along the exhaust port, selectively rotatable relative to the exhaust port, and selectively attachable to the exhaust so as to prevent movement relative thereto;
mounting arms attached to the mounting collar and extending therefrom;
mounting clamps attached to the mounting arms and attachable to a high speed gas powered saw, and
wherein the saw has a saw blade oriented vertically and wherein the exhaust port extends laterally generally parallel to the axis of the saw blade.

19. A dust shroud for a saw, the saw comprising:
a saw blade disposed vertically;
a blade guard extending around an upper portion of the saw blade;
a saw body disposed behind the saw blade; and
a handle disposed adjacent the back of the saw blade;
the dust shroud comprising:
a shroud body disposed adjacent the rear of the saw blade and extending around a portion of the saw blade;
an exhaust port extending laterally from the shroud body, the exhaust port being in communication with an interior of the shroud body;
mounting arms attached to the exhaust port and attached to the handle; and
a mounting collar disposed around the exhaust port, wherein the mounting collar may be selectively moved along the exhaust port and selectively rotated about the exhaust port, and wherein the mounting collar may be selectively clamped in position on the exhaust port.

20. The dust shroud of claim 19, wherein the mounting arms attach to the mounting collar.

21. The dust shroud of claim 19, wherein the mounting arms may be attached to the mounting collar in a plurality of different positions and wherein the angle of the mounting arms relative to the mounting collar may be adjusted.

22. A dust shroud for a saw, the saw comprising:
a saw blade disposed vertically;
a blade guard extending around an upper portion of the saw blade;
a saw body disposed behind the saw blade; and
a handle disposed adjacent the back of the saw blade;
the dust shroud comprising:
a shroud body disposed adjacent the rear of the saw blade and extending around a portion of the saw blade;
an exhaust port extending laterally from the shroud body, the exhaust port being in communication with an interior of the shroud body;
mounting arms attached to the exhaust port and attached to the handle; and
further comprising mounting clamps, the mounting clamps being selectively attachable to the mounting arms at different positions along the mounting arms and being attached to the handle so as to thereby attach the mounting arms to the handle.

* * * * *